US009621173B1

(12) United States Patent
Xiu

(10) Patent No.: US 9,621,173 B1
(45) Date of Patent: Apr. 11, 2017

(54) CIRCUITS AND METHODS OF IMPLEMENTING TIME-AVERAGE-FREQUENCY DIRECT PERIOD SYNTHESIZER ON PROGRAMMABLE LOGIC CHIP AND DRIVING APPLICATIONS USING THE SAME

(71) Applicant: Liming Xiu, Plano, TX (US)

(72) Inventor: Liming Xiu, Plano, TX (US)

(73) Assignee: LIMING XIU, Plano ( * ) Notice: Subject to any disclaimer, the term of this patent is extended or adjusted under 35 U.S.C. 154(b) by 0 days.

(21) Appl. No.: 14/945,468

(22) Filed: Nov. 19, 2015

(51) Int. Cl.
| | |
|---|---|
| G06F 17/50 | (2006.01) |
| H03L 7/197 | (2006.01) |
| H03K 19/173 | (2006.01) |
| H03K 19/017 | (2006.01) |
| H03K 19/018 | (2006.01) |
| G06F 1/10 | (2006.01) |
| G06F 1/12 | (2006.01) |
| H03L 7/099 | (2006.01) |
| H03K 19/0185 | (2006.01) |
| H03K 19/096 | (2006.01) |

(52) U.S. Cl.
CPC .......... *H03L 7/197* (2013.01); *G06F 17/5054* (2013.01); *H03K 19/1737* (2013.01); *H03L 7/0991* (2013.01); *G06F 1/10* (2013.01); *G06F 1/12* (2013.01); *G06F 17/505* (2013.01); *G06F 17/5045* (2013.01); *H03K 19/01728* (2013.01); *H03K 19/01855* (2013.01); *H03K 19/096* (2013.01)

(58) Field of Classification Search
CPC ... H03L 7/197; H03L 7/0991; H03K 19/1737; H03K 19/096; H03K 19/01728; H03K 19/01855; G06F 17/5045; G06F 17/505; G06F 17/5054; G06F 1/10; G06F 171/12
USPC .......... 716/116–117; 326/37–38, 93, 96, 99; 327/39–40, 100, 113, 115–117
See application file for complete search history.

(56) References Cited

U.S. PATENT DOCUMENTS

| | | | | |
|---|---|---|---|---|
| 8,890,591 B1* | 11/2014 | Xiu | .......................... | H03L 1/022 327/147 |
| 9,118,275 B1* | 8/2015 | Xiu | .......................... | H03B 21/02 |
| 9,379,714 B1* | 6/2016 | Xiu | ....................... | G04F 10/005 |

(Continued)

*Primary Examiner* — Stacy Whitmore

(57) ABSTRACT

Circuits of a TAF-DPS clock generator implemented on programmable logic chip comprise: 1) a base time unit generator created from configurable blocks, or on-chip PLL, or on-chip DLL, said base time unit generator produces a plurality of phase-evenly-spaced-signals; 2) a TAF-DPS frequency synthesizer created by configuring configurable blocks of said programmable logic chip, said TAF-DPS frequency synthesizer takes said plurality of phase-evenly-spaced-signals as its input. Methods of creating flexible clock signal to drive application comprise: 1) selecting one or more strategic areas in said programmable logic chip; 2) creating one or more TAF-DPS clock generator for each said area by using the configurable resource in said area; 3) creating control function to control the frequency and duty-cycle of the TAF-DPS clock generator output, said control function can be circuit created from configuring configurable blocks, said control function can also be achieved by software; 4) driving the circuits in application by the flexible clock generated from said TAF-DPS clock generator.

14 Claims, 11 Drawing Sheets

(56) References Cited

U.S. PATENT DOCUMENTS

| | | | |
|---|---|---|---|
| 2008/0174345 A1* | 7/2008 | Boerstler | G01R 29/02 327/115 |
| 2010/0007389 A1* | 1/2010 | Li | H03L 7/07 327/153 |
| 2010/0085085 A1* | 4/2010 | Yang | H03L 7/1976 327/117 |
| 2011/0068820 A1* | 3/2011 | Fox | G01R 31/3016 326/16 |
| 2012/0007638 A1* | 1/2012 | Meng | H03K 23/50 327/115 |
| 2012/0161823 A1* | 6/2012 | Gupta | H03K 21/023 327/115 |
| 2012/0304141 A1* | 11/2012 | Vogel | G06F 17/5045 716/116 |
| 2013/0021069 A1* | 1/2013 | Tsangaropoulos | H03L 1/027 327/115 |
| 2013/0027102 A1* | 1/2013 | Chen | H03K 3/03 327/158 |
| 2013/0043913 A1* | 2/2013 | Tsai | G06F 1/08 327/115 |
| 2013/0135015 A1* | 5/2013 | Hossain | H03B 19/00 327/116 |
| 2014/0002167 A1* | 1/2014 | Milton | H03K 5/156 327/295 |
| 2014/0093015 A1* | 4/2014 | Xiu | H03L 7/0807 375/340 |
| 2014/0380082 A1* | 12/2014 | Hossain | H03B 19/00 713/501 |
| 2015/0149800 A1* | 5/2015 | Gendler | G06F 1/324 713/322 |
| 2015/0200674 A1* | 7/2015 | Chaivipas | H03L 7/0814 327/115 |
| 2015/0288369 A1* | 10/2015 | Staszewski | H03C 3/0966 327/156 |
| 2016/0118962 A1* | 4/2016 | Tseng | H03K 19/21 327/115 |
| 2016/0142065 A1* | 5/2016 | Staszewski | H03C 3/0966 327/156 |
| 2016/0190986 A1* | 6/2016 | Hossain | H03B 19/00 713/600 |
| 2016/0359494 A1* | 12/2016 | Namdar-Mehdiabadi | H03L 7/1978 |

* cited by examiner

CIRCUITS AND METHODS OF IMPLEMENTING TIME-AVERAGE-FREQUENCY DIRECT PERIOD SYNTHESIZER ON PROGRAMMABLE LOGIC CHIP AND DRIVING APPLICATIONS USING THE SAME

FIELD OF THE INVENTION

The present invention generally relates to the field of integrated circuit. More specifically, embodiments of the present invention pertain to circuits and methods of implementing a type of frequency synthesis circuit, Time-Average-Frequency Direct Period Synthesis (TAF-DPS), on programmable logic chip such as FPGA (Field Programmable Gate Array) and CPLD (Complex Programmable Logic Device).

DISCUSSION OF THE BACKGROUND

In a typical VLSI system, there are millions of electrical signals. They are used to make the system perform what it is designed to do. Among those, the most important one is the clock signal. From an operational perspective, clock is the timekeeper of the electrical world inside the chip. From a structural perspective, clock generator is the heart of the chip; clock signal is the blood; and clock distribution network is the vessel.

The purpose of a VLSI system is for processing information. The efficiency of performing this task is highly dependent on its internal time scale. This time scale is defined by the clock signal. There are two major concerns when a clock signal is created and used: the clock frequency and the frequency resolution. In addition, another issue is also important: the speed that the time scale can be switched from one to another (the speed of clock frequency switching). The task of creating such clock signal for driving electronic system is often termed frequency synthesis.

In the field of frequency synthesis, there are three major technologies developed during the evolution of several decades: analog direct frequency synthesis, Digital Direct Synthesis (DDS) and PLL based indirect frequency synthesis. Each of them has been used effectively in its appropriate application domains. For on-chip frequency generation, PLL has been the designers' first choice due to its easy integration with other circuitries on chip. Regardless the tremendous effort spent on the study of frequency synthesis, however, there are still two problems that have not been solved to our complete satisfaction: arbitrary frequency generation (small frequency granularity or fine frequency resolution) and instantaneous frequency switching (fast frequency switching speed). In contrast, when analog voltage is concerned, designer can reach almost any voltage level (within a given range and a given quantization error) and, further, voltage level can be switched from one to another within a short period of time (given reasonable loading).

To address the issue of small frequency granularity, a novel concept, Time-Average-Frequency (TAF), is proposed in 2008 [1]. It removes the constraint that all the cycles in a clock pulse train have to be equal in their length-in-times. As a result, a TAF clock signal can be created by using two, or more, types of cycles. Small frequency granularity can be obtained by adjusting the weighing factor in very fine step. Fast frequency switching is accomplished through directly synthesizing the length of each individual clock pulse. Together, a new technology, Time-Average-Frequency Direct Period Synthesis, is emerged [2]. Its aim is to provide the features of arbitrary frequency generation and instantaneous frequency switching to chip designers and system users. The clock signal bearing the features of arbitrary frequency generation and instantaneous frequency switching is termed flexible clock signal. The impact, its influence on the design of various electronic systems, is extensively discussed in [2] as well.

A programmable logic device is an electronic component used to build reconfigurable digital circuits. Unlike a logic gate, which has a fixed function, a programmable logic device has an undefined function at the time of manufacture. Before the programmable logic device can be used in a circuit, it must be programmed (or configured). Field programmability is achieved through switches, which are transistors controlled by memory elements or fuses. The switches control the following two aspects of the programmable logic device: the interconnection among wire segments, the configuration of logic blocks. The technology of programmable element varies from vendor to vendor and it can be classified into three categories: SRAM based, fuse based and EPROM/EEPROM/Flash based. Although different in operation, they all share the common property: configure the switch in one of the 'ON' and 'OFF' positions.

Among commercially available programmable logic chips, the architectures differ from vendor to vendor. They can be characterized by two factors: 1) the structure and content of logic block, 2) the structure and content of routing resource. Nowadays, there are two major technologies in the family of programmable logic chips: FPGA and CPLD. These two types of devices have very different internal architectures. FPGA is considered as 'fine-grain' because it contains a lot of tiny logic blocks which have flip-flop, combination logic, and memory. It is designed for complex applications. The time delay in FPGA is unpredictable because of its architecture. FPGA's architecture allows the chip to have a very high logic capacity. It is used in designs that require a high gate count. It is a type of a programmable logic chip that can be programmed to do almost any kind of digital function. CPLD is considered as 'coarse-grain' type of devices. Compared to FPGA, it contains only a few but larger blocks of logic. It offers a much faster operation speed because of its simpler, 'coarse grain' architecture. Additionally, the programming in CPLD is carried out using fuse, EPROM or EEPROM as contrast to the use of SRAM in FPGA programming. Thus, it is non-volatile. Since it has a less complex architecture, the delay is much predictable in CPLD. CPLD is often used for simple logic applications. It is more suitable for small gate count designs.

The important features of arbitrary frequency generation and instantaneous frequency switching enabled by TAF-DPS clock generator are extremely useful for future electronic system designs. They are the enabler for future innovations. Meanwhile, the field programmability offered from programmable logic device is an ideal platform for exploring new ideas. Therefore, implementing TAF-DPS on programmable logic device can provide people with another dimension for innovation. It is the engine for a suite of new applications in electronic system design.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

It is therefore an object of the present invention to use the resource residing in programmable logic chip for creating TAF-DPS clock generators on said chip. It is a further object of the present invention to use said TAF-DPS clock generators for driving other functional circuitries on said chip so that novel system/architecture/chip level design ideas can be explored by chip user.

The present invention relates to circuits and methods of using programmable logic chip to build TAF-DPS clock generators. Thus, the present invention can take advantage of the powerful frequency generation capability provided by TAF-DPS and the flexibility offered from programmable logic chip. As a result, it expands people's capability of designing electronic system to a higher level.

DETAILED DESCRIPTION

Figure 1:
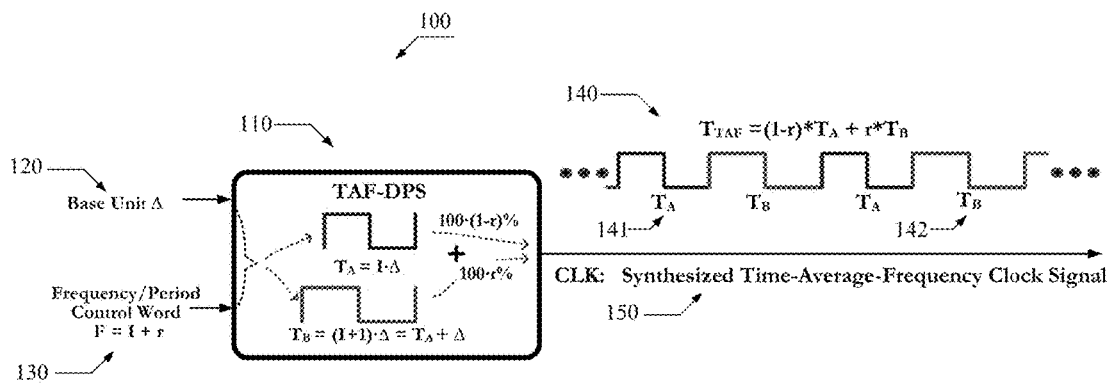
FIG. 1 is an electrical diagram, in block form, showing the general principle of TAF-DPS.

Reference will now be made in detail to various embodiments of the invention, examples of which are illustrated in the accompanying drawings. While the invention will be described in conjunction with the following embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the arts of VLSI-circuit-and-system design to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer or signal processing system, or similar processing device (e.g., an electrical, optical, or quantum computing or processing device), that manipulates and transforms data represented as physical (e.g., electronic) quantities. The terms refer to actions and processes of the processing devices that manipulate or transform physical quantities within the component(s) of a system or architecture (e.g., registers, memories, flip-flops, other such information storage, transmission or display devices, etc.) into other data similarly represented as physical quantities within other components of the same or a different system or architecture.

Furthermore, for the sake of convenience and simplicity, the terms "clock," "time," "rate," "period," "frequency" and grammatical variations thereof are generally used interchangeably herein, but are generally given their art-recognized meanings. Also, for convenience and simplicity, the terms "data," "data stream," "waveform" and "information" may be used interchangeably, as may the terms "connected to," "coupled with," "coupled to," and "in communication with" (each of which may refer to direct or indirect connections, couplings, and communications), as may the terms "electrical path," "channel," "wire" (each of which may refer to a physical channel for transferring electrical signal), as may the terms "signal," "pulse," "pulse train," "a sequence of digital data" (each of which may refer to an electrical signal that has only two values: zero and one), as may the terms "input," "input port," "input pin" (each of which may refer to a physical channel for receiving data), as may the terms "output," "output port," "output pin" (each of which may refer to a physical channel for sending data), but these terms are also generally given their art-recognized meanings.

Referring now to FIG. 1, the principle of TAF-DPS architecture 100 will be explained. A TAF-DPS frequency synthesizer 110 has two inputs: a first input for taking a base time unit Δ 120 and a second input for taking a frequency/period control word 130 F=I+r where I is an integer of greater than one and r is a fraction of 0≤r<1. TAF-DPS frequency synthesizer 110 has one output CLK 150. It outputs the synthesized Time-Average-Frequency flexible clock signal. Starting from the base unit Δ 120, the TAF-DPS frequency synthesizer creates two types of cycles $T_A=I\cdot\Delta$ and $T_B=(I+1)\cdot\Delta$. Its output CLK is a clock pulse train 140 that consists of the type of cycles $T_A$ 141 and $T_B$ 142. They are used in an interleaved fashion. The fraction r represents the occurrence possibility of cycle type $T_B$ and $T_A$.

Figure 2:
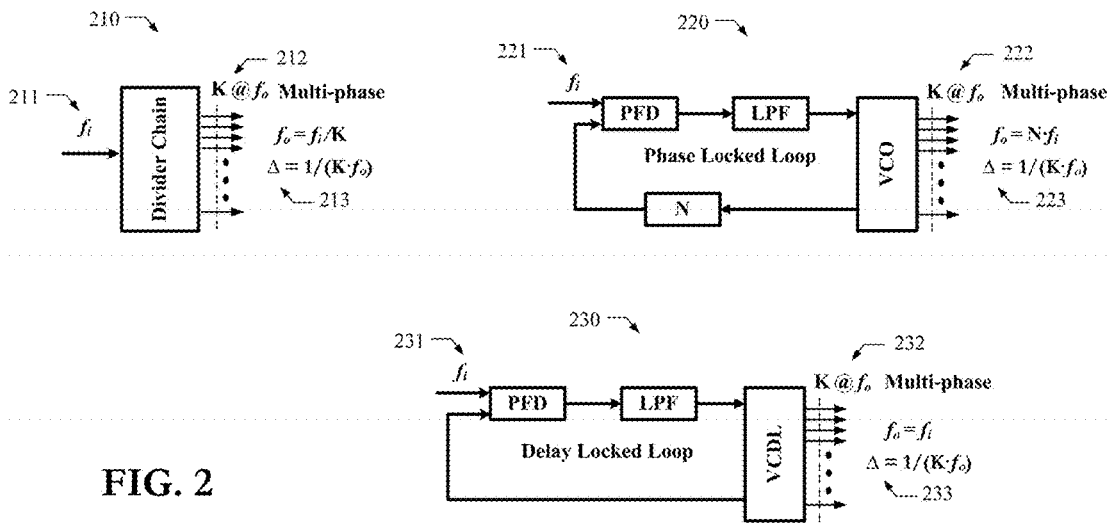
FIG. 2 is an electrical diagram, in block form, showing the various methods of creating the base time unit Δ.

The base unit Δ 120 is generated from a plurality of phase-evenly-spaced-signals. Referring now to FIG. 2, a plurality of phase-evenly-spaced-signals can be created from a divider chain, a VCO (voltage controlled oscillator) that is locked to a reference through a PLL (Phase Locked Loop) or a VCDL (voltage controlled delay line) that is locked to an input through a DLL (Delay Locked Loop). In divider chain 210, an input signal of frequency f 211 is frequency divided by a chain of dividers. It results in a plurality of K phase-evenly-spaced-signals of frequency $f_o$ 212 with $f_o=f_i/K$. The value of base time unit Δ 213 is the time span between any two logically adjacent signals of said plurality of K phase-evenly-spaced-signals and it is $\Delta=T_o/K=1/(K\cdot f_o)$. In the case of PLL 220, the VCO 222 is locked to an input reference with frequency of $f_i$ 221 through a divide-by-N divider. The VCO has a plurality of K phase-evenly-spaced-signals of frequency $f_o$ 222 and $f_o$=N{fourth root}$f_i$. The value of base time unit Δ 223 is the time span between any two logically adjacent signals of said plurality of K phase-evenly-spaced-signals and in this PLL case it is therefore $\Delta=T_o/K=1/(K\cdot N\cdot f_o)=1/(K\cdot N\cdot f_i)$. In the case of DLL 230, the VCDL is locked to an input signal with frequency $f_i$ 231. The VCDL has a plurality of K phase-evenly-spaced-signals of frequency $f_o$ 232 and $f_o=f_i$. The value of base time unit Δ 233 is the time span between any two logically adjacent signals of said plurality of K phase-evenly-spaced-signals and in this DLL case it is $\Delta=T_o/K=1/(K\cdot f_o)=1/(K\cdot f_i)$.

Figure 3:
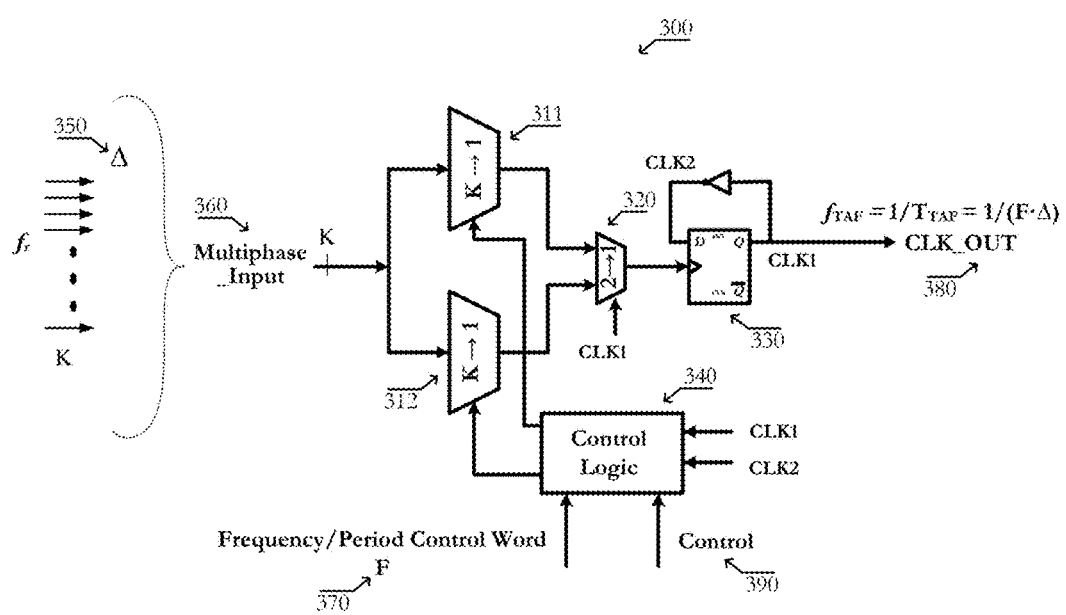
FIG. 3 is an electrical diagram, in block form, showing the circuit structure of TAF-DPS.

Referring now to FIG. 3, the internal circuit structure of TAF-DPS frequency synthesizer will now be described. A TAF-DPS frequency synthesizer 300 comprises two K→1 multiplexers 311 and 312, a 2→1 multiplexer 320, a D-type flip-flop configured as toggle flip-flop 330 and a control logic block 340. The TAF-DPS frequency synthesizer 300 takes signal Multiphase_Input 360 as an input. Multiphase_Input 360 has K evenly-spaced phases of frequency $f_r$. The time span between any two logically adjacent phases is Δ 350 and it is calculated as $\Delta=T_r/K=1/(K\cdot f_r)$. The TAF-DPS frequency synthesizer 300 takes signal F 370 as the input to control its output frequency (or period). The TAF-DPS frequency synthesizer 300 takes signal F 390 as another input to control its duty-cycle. The TAF-DPS frequency synthesizer 300 has an output signal CLK_OUT 380 that outputs a flexible clock signal with frequency $f_{TAF}$.

The TAF-DPS frequency synthesizer output's period can be calculated as $T_{TAF}=F\cdot\Delta$. The control word F can take value in the range of [2, 2K], fraction included. When only integer is used in control word F, the TAF-DPS output is a signal of conventional frequency (i.e. only one type of cycle is used in the clock pulse train). When control word F has fractional part, the TAF-DPS uses Time-Average-Frequency concept in its output signal (i.e. more than one type of cycles can be used in the clock pulse train). The Time-Average-Frequency concept is explained in chapter 3 of reference [2]. The working principle of TAF-DPS can be found in chapter 4 of reference [2]. TAF-DPS frequency synthesizer 300 can function as the circuit block 110 in FIG. 1. The signal F 370 functions as the control word F 130 in FIG. 1. The signal CLK_OUT 380 functions as the signal CLK 150 in FIG. 1.

$$f_{TAF}=1/T_{TAF}=1/(F\cdot\Delta) \quad (1)$$

$$f_{TAF}=f_i/F \quad (2)$$

$$f_{TAF}=(K\cdot N/F)\cdot f_i \quad (3)$$

$$f_{TAF}=(K/F)\cdot f_i \quad (4)$$

The signal CLK_OUT 380 output frequency $f_{TAF}$ can be calculated using (1) (please see chapter 4 of reference [2]). When divider chain 210 of FIG. 2 is used as the circuit for generating base time unit Δ, equation (2) can be derived from (1). When PLL 220 of FIG. 2 is used as the circuit for generating base time unit Δ, equation (3) can be derived from (1). When DLL 230 of FIG. 2 is used as the circuit for generating base time unit Δ, equation (4) can be derived from (1).

In current application, the term TAF-DPS clock generator describes the system that includes one or more TAF-DPS frequency synthesizers and a base time unit generator.

Figure 4A:
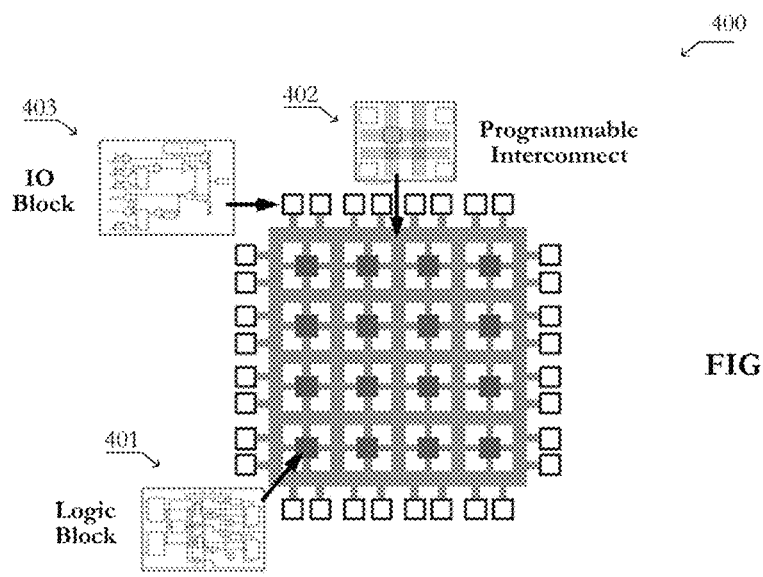
FIG. 4A is an electrical diagram, in block form, showing the general architecture of FPGA programmable logic chip.

Referring now to FIG. 4A, a generic FPGA system 400 is illustrated. A FPGA chip 400 consists of three types of circuitries: logic block 401, programmable interconnect 402 and IO block 403. Logic block 401 is configurable. It is a functionally complete element. In other words, it can be configured in the field to realize any digital function. A large number of such elements are placed in an interconnect framework. Large and complex logic functions are built up by connecting multiple such logic blocks together. The interconnect framework consists of programmable interconnect 402, which is further consisted of programmable switching matrix and programmable connection matrix. The task of connecting logic blocks is accomplished by programming the programmable interconnects. On the boundary of FPGA chip 400, multiple copies of IO block 403 are placed to facilitate the task of data communication from/to the chip. The IO block 403 is configurable. It can be configured as input, output and some other special functions.

Figure 4B:
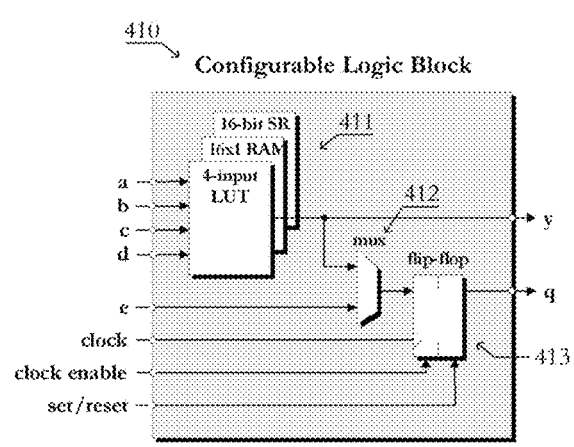
FIG. 4B is an electrical diagram, in block form, showing an exemplary implementation of configurable logic block used in FPGA programmable logic chip.

FIG. 4B shows the structure of an exemplary logic block that can be configured to implement logic operation. Configurable logic block 410 consists of a 4-input LUT (look-up table) 411, a multiplexer 412 and a flip-flop 413. The LUT can be used to realize logic operation. The multiplexer is used to provide a bypass capability. The output of logic block 410 can be asynchronous, or synchronous through flip-flop 413 that is controlled by a clock signal. To a person skilled in the art, it is understandable that the description provided above is just one embodiment of configurable logic block. There are varieties of other methods for constructing configurable logic block.

Figure 5A:
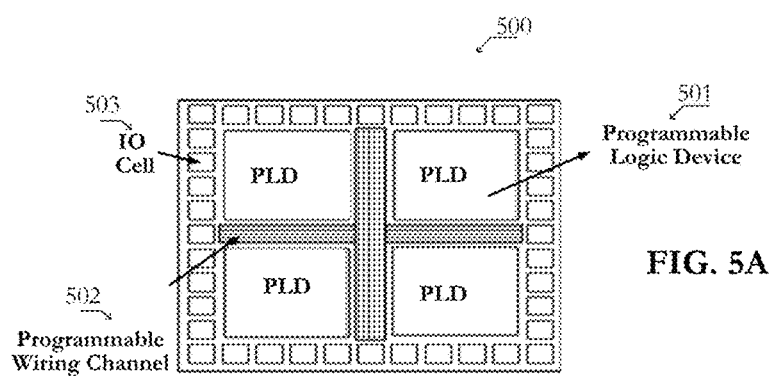
FIG. 5A is an electrical diagram, in block form, showing the general architecture of CPLD programmable logic chip.

Referring now to FIG. 5A, a generic CPLD system 500 is illustrated. A CPLD chip 500 consists of three types of circuitries: programmable logic device 501, programmable wiring channel 502 and IO cell 503. Programmable logic device 501 is configurable. It is a functionally complete element. It can be configured in the field to realize any digital function. A plurality of such elements are placed in an interconnect framework. Complex logic functions are built up by connecting multiple such programmable logic devices together. The programmable wiring channels are used to connect the logic devices. The connections are accomplished by programming the channels. On the boundary of CPLD chip 500, multiple copies of IO cell 503 are placed to facilitate the task of input/output communication. The IO block 503 is configurable. It can be configured as input, output and some other special functions.

Figure 5B:
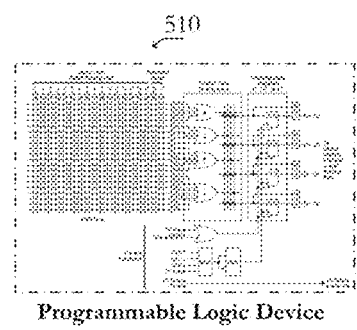
FIG. 5B is an electrical diagram, in block form, showing an exemplary implementation of programmable logic device used in CPLD programmable logic chip.

FIG. 5B shows the structure of an exemplary programmable logic device that can be configured to realize logic operation. Programmable logic device 510 consists of an array of NAND and OR gates. They are used to implement sum-of-product logic function. The output of programmable logic device 510 can be asynchronous, or synchronous through flip-flop that is controlled by a clock signal. To a person skilled in the art, it is understandable that the description provided above is just one embodiment of programmable logic device. There are varieties of other methods for constructing programmable logic device.

Figure 6A:
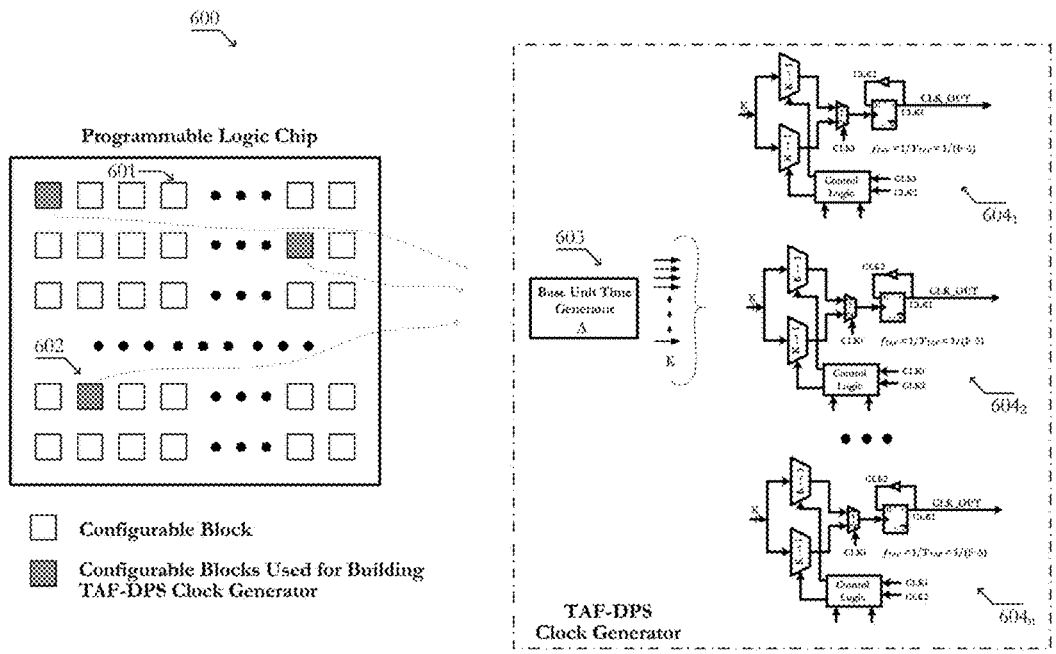
FIG. 6A is an electrical diagram, in block form, illustrating an embodiment of present invention of implementing TAF-DPS clock generators in programmable logic chip.

Refer now to FIG. 6A, an embodiment of using resource in a programmable logic chip (such as FPGA or CPLD or other) to create TAF-DPS clock generators according to present invention is described. System 600 is a programmable logic chip that could be FPGA, CPLD or other types of chips made of programmable logics. Block 601 is a base programmable unit that is the configurable logic block in the case of FPGA, or the programmable logic device in the case of CPLD, or other type of programmable unit in other type of programmable logic chip. Block 601 is termed configurable block in current application. Block 602 is a circuit that consists of one or more blocks 601. Said blocks 601 inside block 602, assisted by interconnect blocks which are not drawn in the figure for brevity, are configured to create one or more TAF-DPS clock generators. Functionally, block 602 is configured to create two functional circuits: base time unit $\Delta$ generator 603 and TAF-DPS synthesizers $604_1$, $604_2$, ..., $604_n$. The output from base time unit $\Delta$ generator 603 is fed to the TAF-DPS synthesizers. Both functions 603 and 604 are created from one or more instances of base programmable unit 601.

Figure 6B:
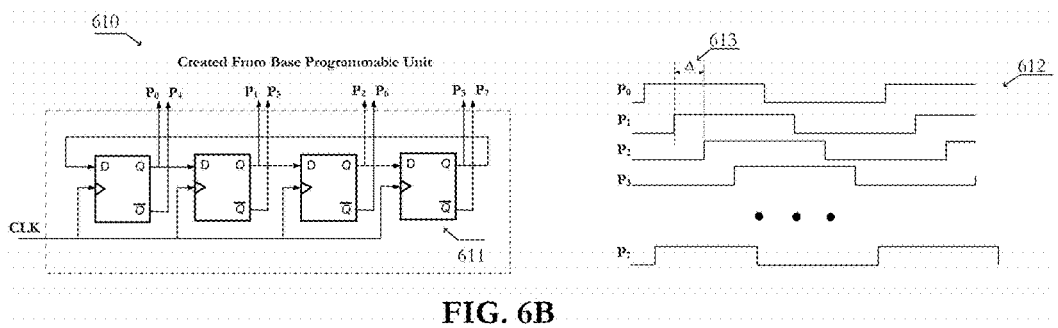
FIG. 6B is an electrical diagram, in block form, illustrating an embodiment of present invention of using programmable logic device or configurable logic block to create a Johnson counter for generating base time unit Δ.

Refer now to FIG. 6B, an embodiment of using configurable blocks to create base time unit $\Delta$ according to present invention is described. Configurable blocks are configured to create a Johnson counter 610 which comprises a plurality of D-type flip-flops 611 driven by a clock signal. Said flip-flops are connected in series. The non-inverting data output of each D-type flip-flop is connected to the data input of the flip-flop which is logically next to said flip-flop. The non-inverting output of the last flip-flop in the series is connected to the input of the first flip-flop in the series. Both the non-inverting and inverting outputs of each said D-type flip-flop are used as Johnson counter's outputs. The outputs from all said flip-flops form a plurality of phase-evenly-spaced-signals (the timing mismatch between the non-inverting and inverting outputs is assumed small and is ignored). The time span between any two logically adjacent said signals is the base time unit $\Delta$. In FIG. 6B, an example of 4-stage Johnson counter consisting of four flip-flops is illustrated. Four D-type flip-flops 611 are connected in series. Said flip-flops are all configured from configurable blocks. A plurality of eight phase-evenly-spaced-signals 612 is resulted. Base time unit $\Delta$ 613 is formed from any two logically adjacent said signals.

In another embodiment of present invention, the base time unit $\Delta$ is created from a plurality of phase-evenly-spaced-signals generated from an on-chip PLL. Said PLL is equipped on the programmable logic chip as a standard module. Multiple phases of same frequency are produced from said PLL. Said base time unit $\Delta$ is formed from any two logically adjacent signals from said multiple phases.

In a third embodiment of present invention, the base time unit $\Delta$ is created from a plurality of phase-evenly-spaced-signals generated from an on-chip DLL. Said DLL is equipped on the programmable logic chip as a standard module. Multiple phases of same frequency are produced from said DLL. Said base time unit $\Delta$ is formed from any two logically adjacent signals from said multiple phases.

Figure 7:
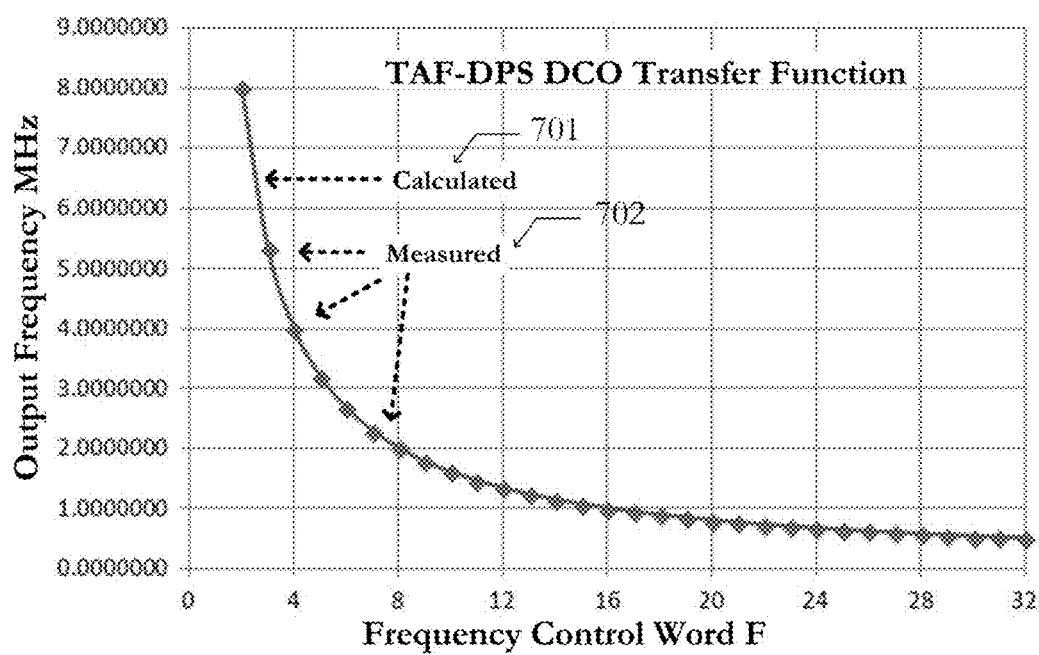
FIG. 7 is experimental data showing the frequency transfer function of a TAF-DPS clock generator implemented on a FPGA programmable logic chip.

Refer now to FIG. 7, a frequency transfer function of a TAF-DPS clock generator is illustrated. The frequency transfer function is generated from a TAF-DPS clock generator created according to the present invention on a FPGA chip. A Johnson counter of eight flip-flops is driven by a clock signal of $f_i$=16 MHz, resulting in a plurality of sixteen phase-evenly-spaced-signals of frequency 1 MHz (K=16). The base time unit is thus $\Delta$=1 ms/16=62.5 us. Said plurality of sixteen phase-evenly-spaced-signals are fed to a TAF-DPS frequency synthesizer. According to equation (1), the output frequency is inversely proportional to the frequency control word F. This is clearly evidenced by the data shown in FIG. 7. In this setting, frequency control word F takes value from the range of [2, 2K] (=[2, 32]). The curve 701 is calculated using equation (1). The dots 702 show the measured values when F takes all the integer numbers in the range of [2, 32]. They are measured using a frequency counter. The measured result (the dots 702) aligns well with the prediction of equation (2) (the line 701).

Figure 8:
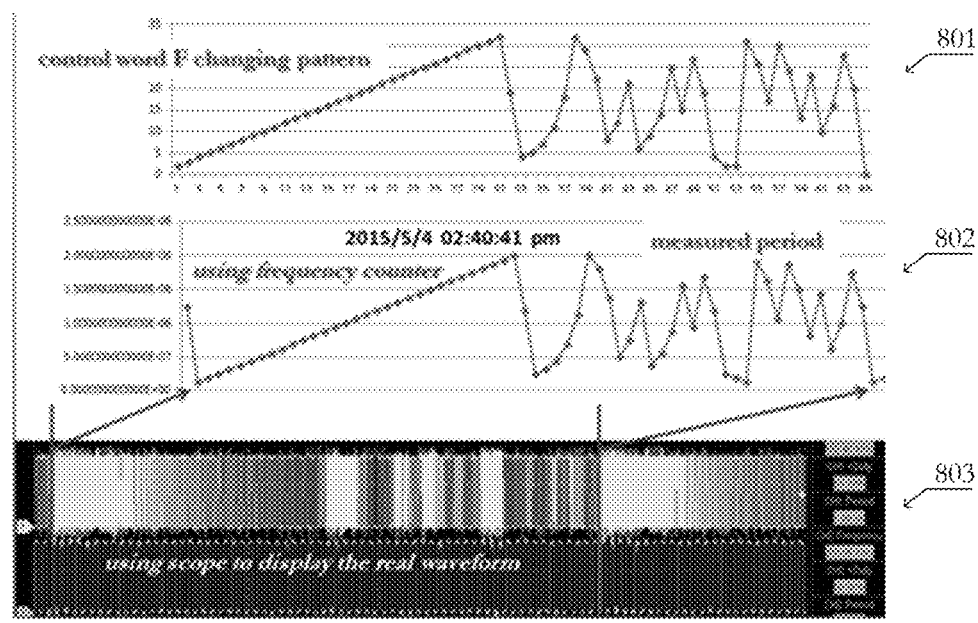
FIG. 8 is experimental data showing the period transfer function and clock waveform of a TAF-DPS clock generator implemented on a FPGA programmable logic chip.

Refer now to FIG. 8, the period transfer function of said TAF-DPS clock generator on the FPGA chip is illustrated. According to equation (1), said TAF-DPS clock generator's output period is linearly proportional to the frequency control word F. Curve 801 is the frequency control word F vs. time changing pattern. It is measured by using a frequency counter. The measurement is accomplished by continually measuring the clock signal's period once every fixed time interval (such as 1 ms). In this experiment, the frequency control word F is changed once every fixed time interval (not necessarily the same time interval for measurement). In the first half of the shown time frame, the control word F linearly increases with time. In the second half, the control word F changes randomly. Curve 802 shows the measured period vs. time using the frequency counter. As evidenced from the curves, the pattern of curve 802 follows that of curve 801 since there is a linear relationship between them as predicted from equation (1). Waveform 803 is the real waveform, displayed on an oscilloscope, which corresponds to the very frequency control word changing pattern. It provides another perspective on the frequency control word changing pattern 801. It aligns with the period changing pattern of curve 802.

$$f_1/f_2 = F_2/F_1 = (I_2+r_2)/(I_1+r_1) \tag{5}$$

$$f_1/f_2 = (1+r/I) \tag{6}$$

Figure 9:
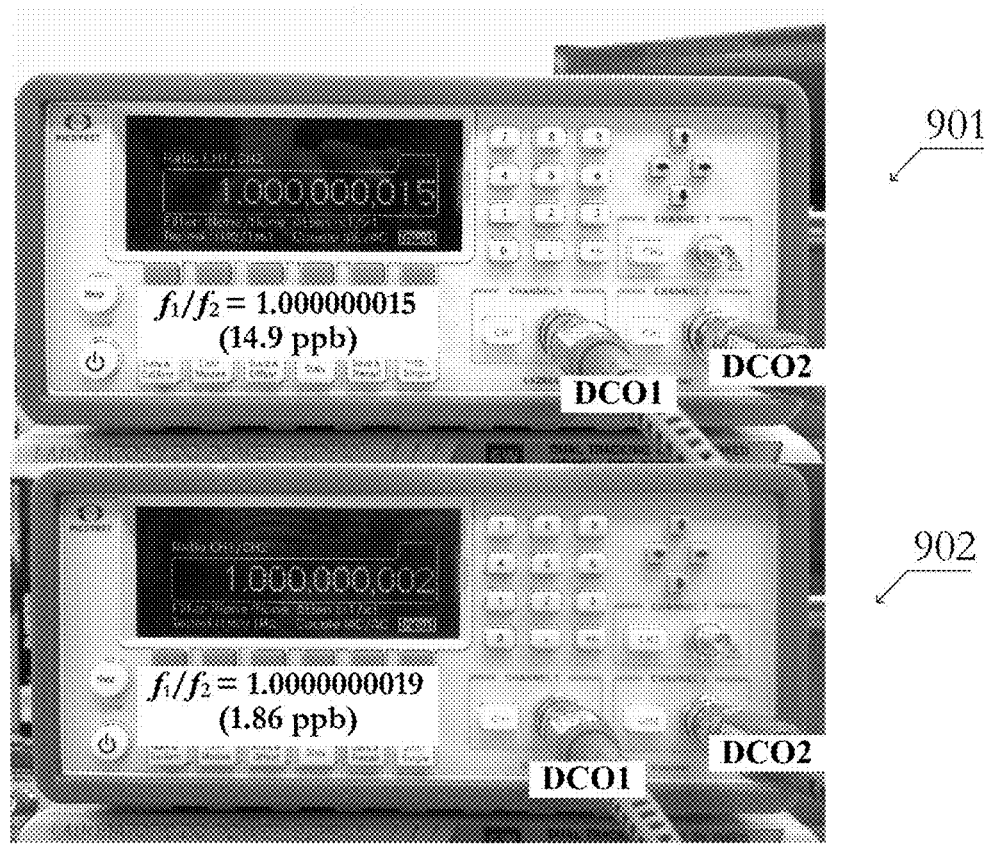
FIG. 9 is experimental data showing the frequency granularity of a TAF-DPS clock generator implemented on a FPGA programmable logic chip.

Refer now to FIG. 9, the fine frequency resolution (also called small frequency granularity) achieved by said TAF-DPS clock generator on the FPGA chip is illustrated. In this experimental setting, there are two identical TAF-DPS frequency synthesizers that are both connected to the said Johnson counter of eight flip-flops. The frequency control word of the TAF-DPS frequency synthesizer can be expressed as F=I+r where I is an integer in the range of [2, 2K] (=[2, 32]) and r is a fraction in the range of 0≤r<1. For said two frequency synthesizers, the values of their frequency control words are $F_1=I_1+r_1$ and $F_2=I_2+r_2$, respectively. According to equation (1), the ratio of the two output frequencies is calculated as (5) since base time unit Δ is same for both synthesizers. It becomes (6) when $I_1=I_2=I$, $r_1=0$ and $r_2=r$. For the case of I=4 and $r=2^{-24}$, $f_1/f_2=1.0000000149$. This corresponds to a frequency resolution $(f_1-f_2)/f_1=14.9e-9$, or 14.9 ppb. Measurement 901 displays the measured ratio using a high precision frequency counter where signals DCO1 and DCO2 are the outputs from TAF-DPS frequency synthesizer #1 and TAF-DPS frequency synthesizer #2, respectively. In the case of I=4 and $r=2^{-27}$, $f_1/f_2=1.0000000019$ as calculated from (6). This corresponds to a frequency resolution $(f_1-f_2)/f_1=1.9e-9$, or 1.9 ppb. Measurement 902 displays the measured ratio using a high precision frequency counter where signals DCO1 and DCO2 are the outputs from TAF-DPS frequency synthesizer #1 and TAF-DPS frequency synthesizer #2, respectively.

Figure 10:
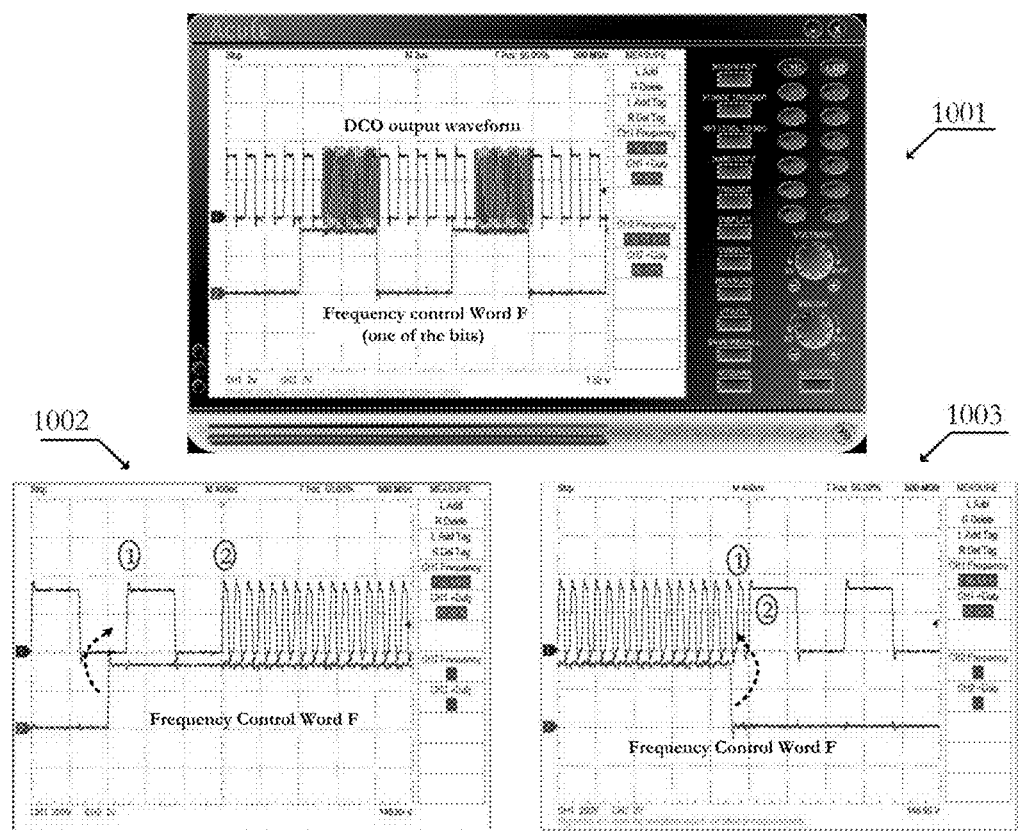
FIG. 10 is experimental data showing the frequency switching process of a TAF-DPS clock generator implemented on a FPGA programmable logic chip.

Refer now to FIG. 10, the fast frequency switching speed achieved by said TAF-DPS clock generator on the FPGA chip is illustrated. Waveform 1001 shows the real waveform when the frequency control word of said TAF-DPS clock generator alternates its value between a first value of 16 to a second value of 2. The bottom trace is one of the bits that represent the frequency control word F. The upper trace is the TAF-DPS clock generator output waveform. As shown, when the value of the frequency control word changes, the TAF-DPS clock generator responds in two cycles. In other words, the clock waveform (and thus its frequency) changes after two cycles of receiving the command. This two-cycle frequency switching speed is designed in the circuit. In waveform 1002, zoom-in view of a part of waveform 1001 showing slow-to-fast-switching (1 MHz to 8 MHz) is illustrated. In waveform 1003, zoom-in view of a part of waveform 1001 showing fast-to-slow-switching (8 MHz to 1 MHz) is illustrated. In both cases, two cycles of switching speed is evidenced.

Figure 11:
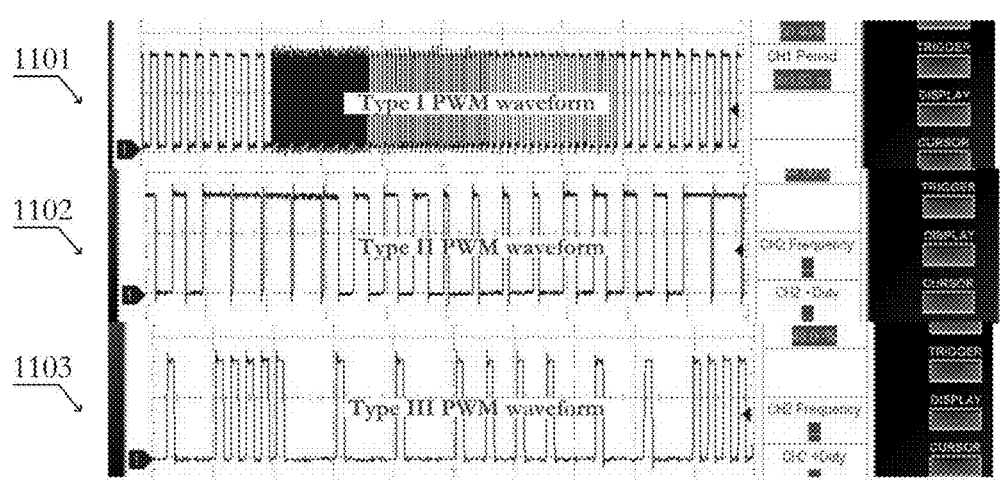
FIG. 11 is experimental data showing various PWM waveforms generated from a TAF-DPS clock generator implemented on a FPGA programmable logic chip.

Refer now to FIG. 11, three types of real Pulse Wave Modulation (PWM) waveforms are displayed. Said PWM waveforms are generated from said TAF-DPS clock generator implemented on said FPGA chip. Trace 1101 is a PWM waveform of fixed-duty-cycle-variable-period. Trace 1102 is a PWM waveform of fixed-period-variable-duty-cycle. Trace 1103 is a PWM waveform of fixed-pulse-length-variable-period. All three types of PWM waveforms are produced from said TAF-DPS clock generator by programming the frequency control word (370 in FIG. 3) and control (390 in FIG. 3).

Figure 12:
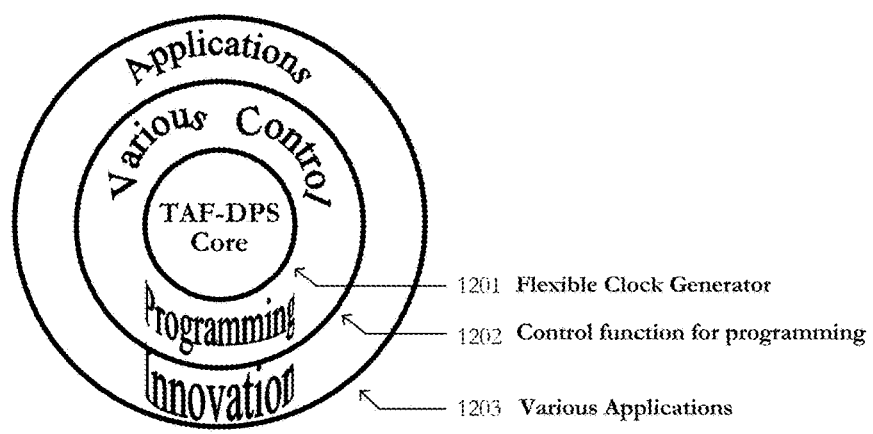
FIG. 12 illustrates an embodiment of present invention of using TAF-DPS clock generator implemented on programmable logic chip as a flexible clock core for driving applications.
Figure 1:
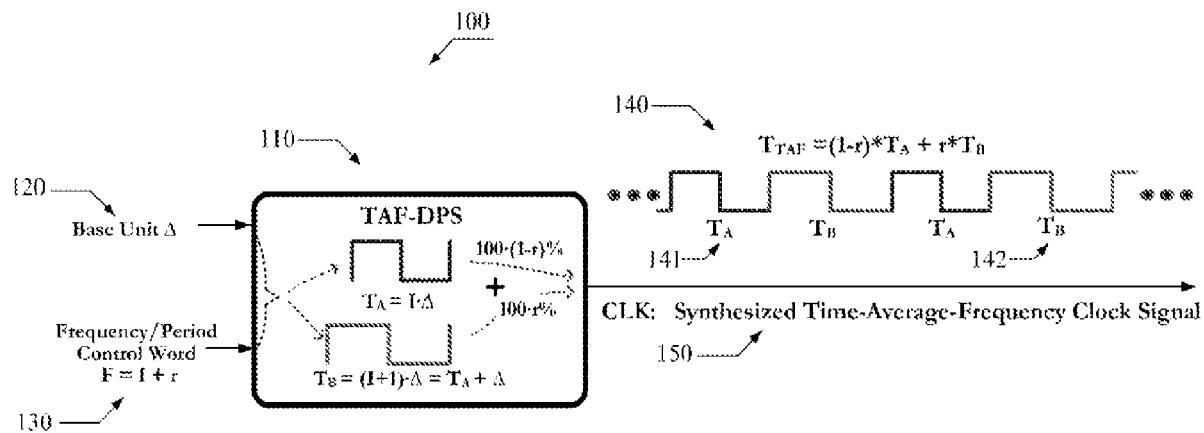
Figure 2:
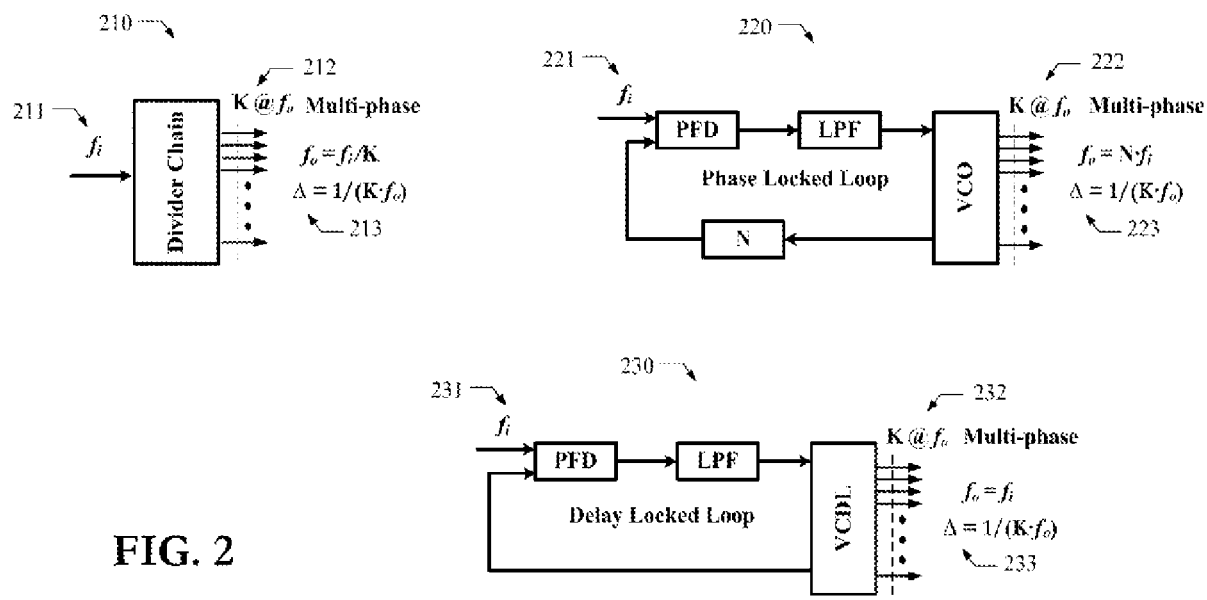
Figure 3:
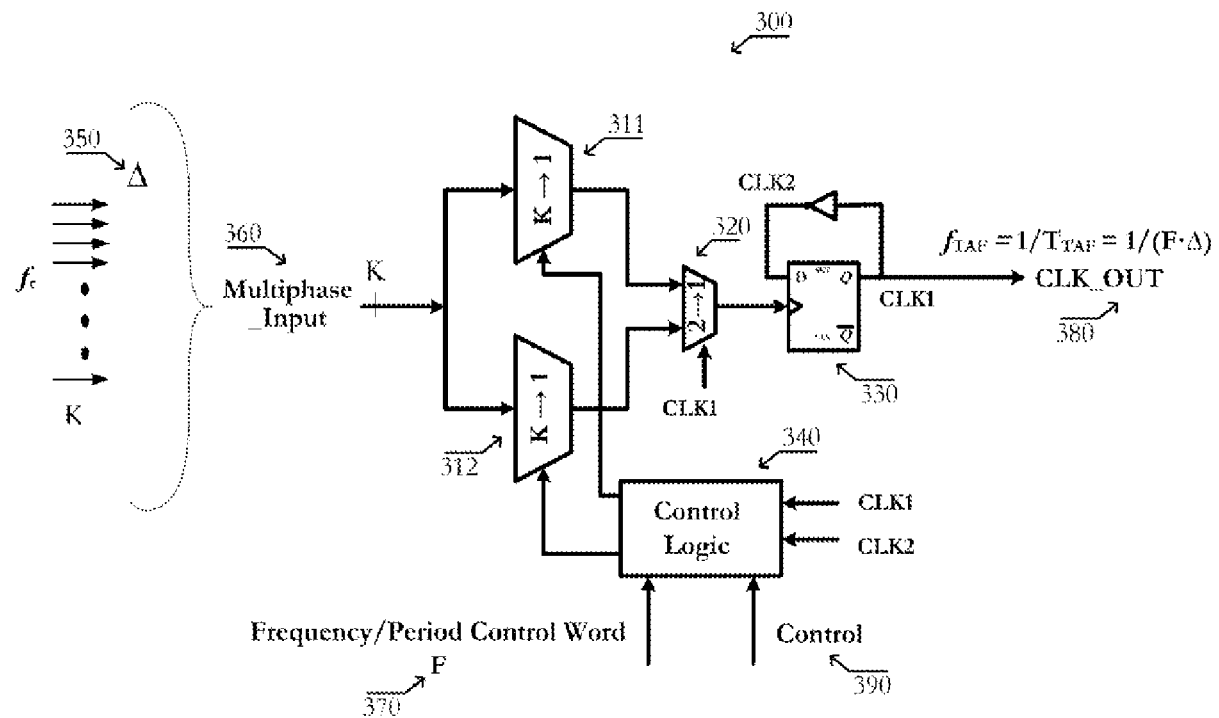
Figure 4A:
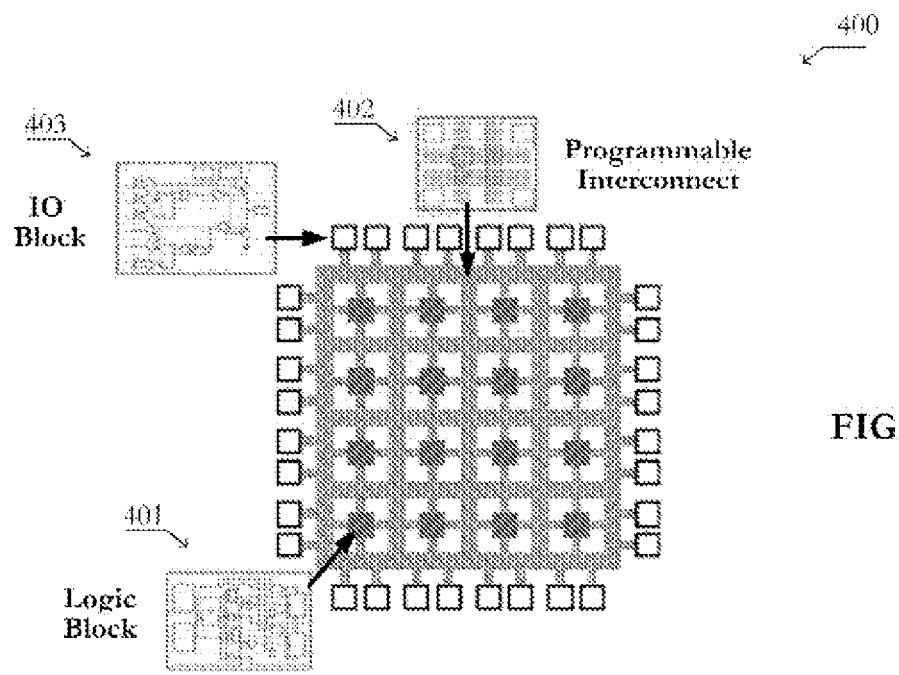
Figure 4B:
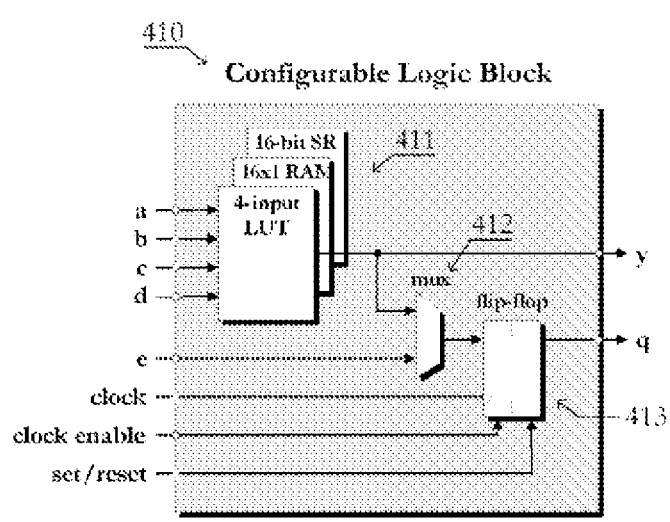
Figure 5A:
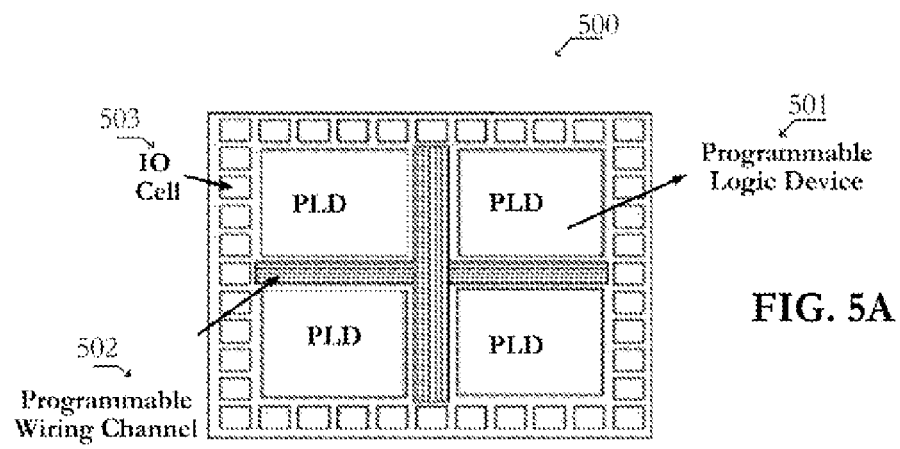
Figure 5B:
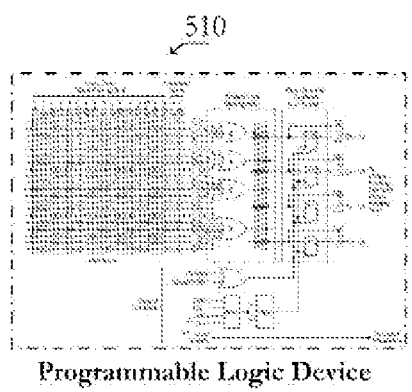
Figure 6A:
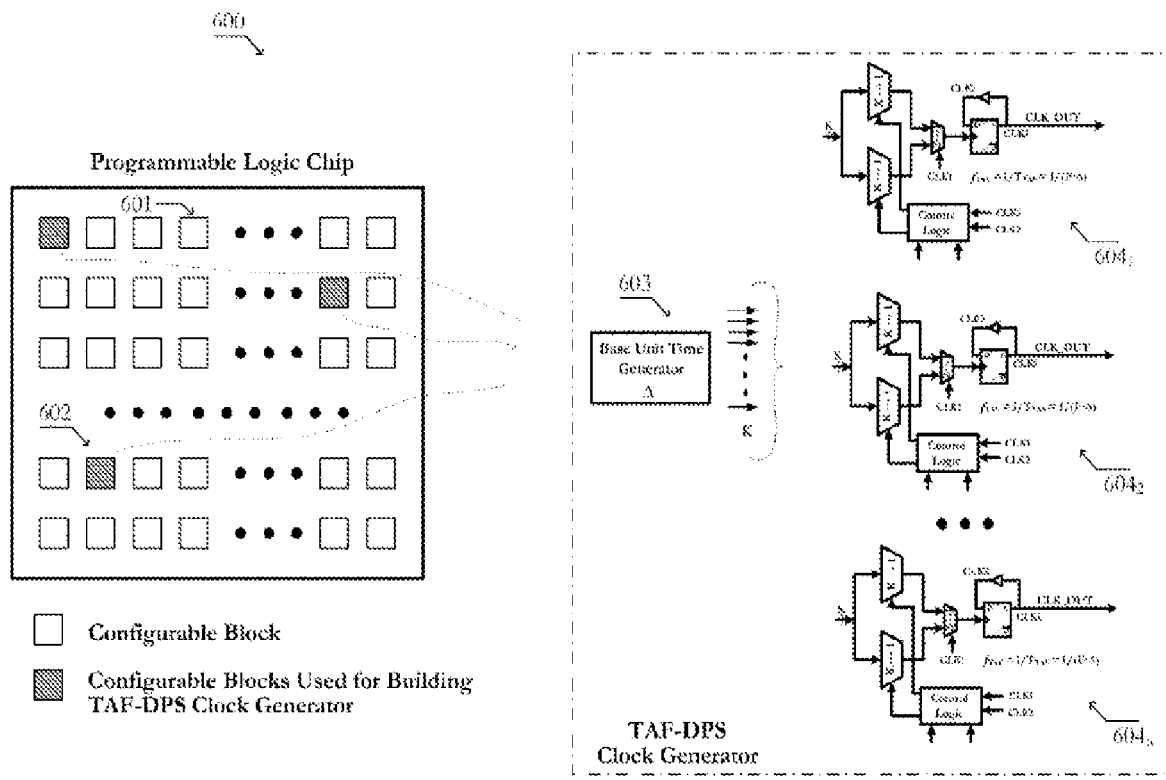
Figure 6B:
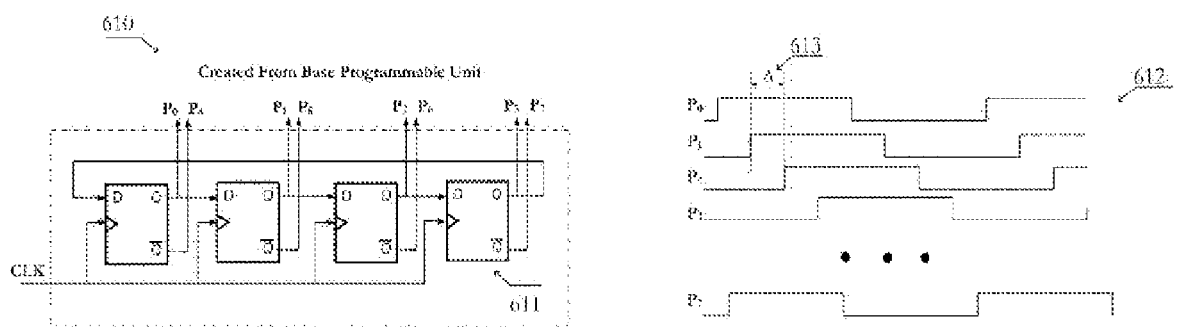
Figure 7:
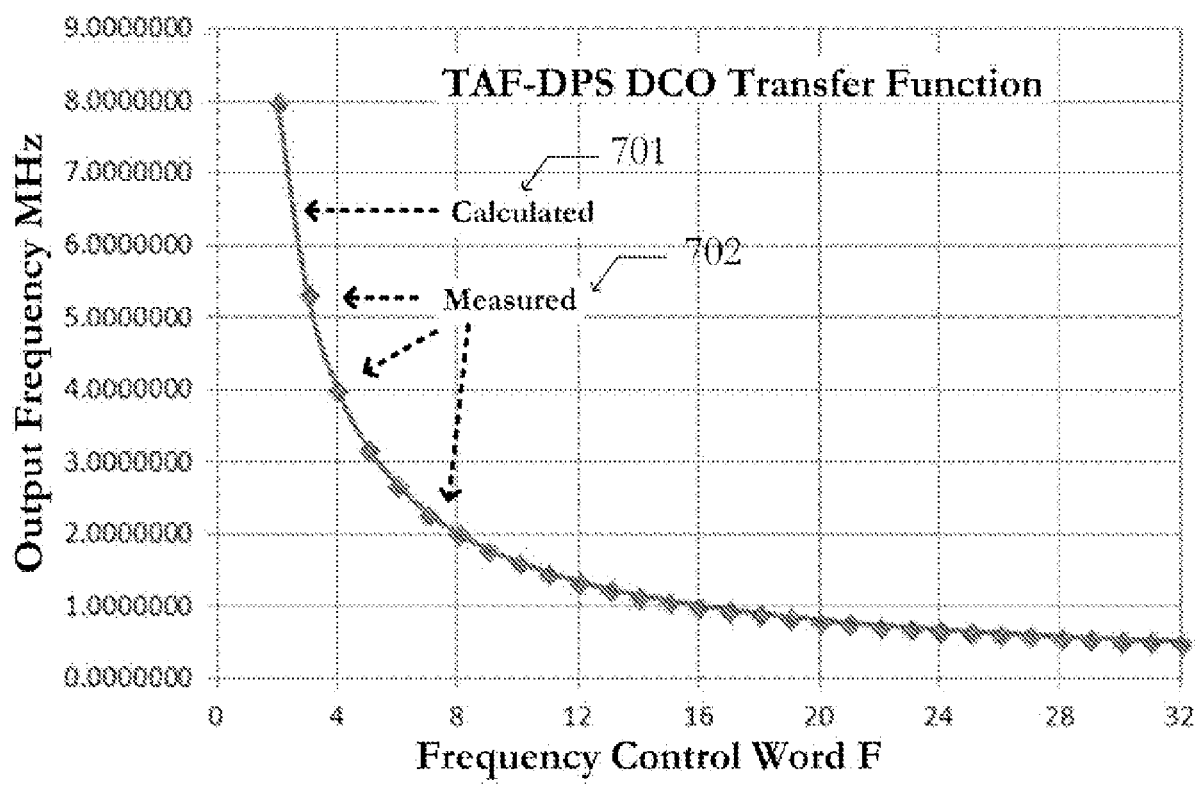
Figure 8:
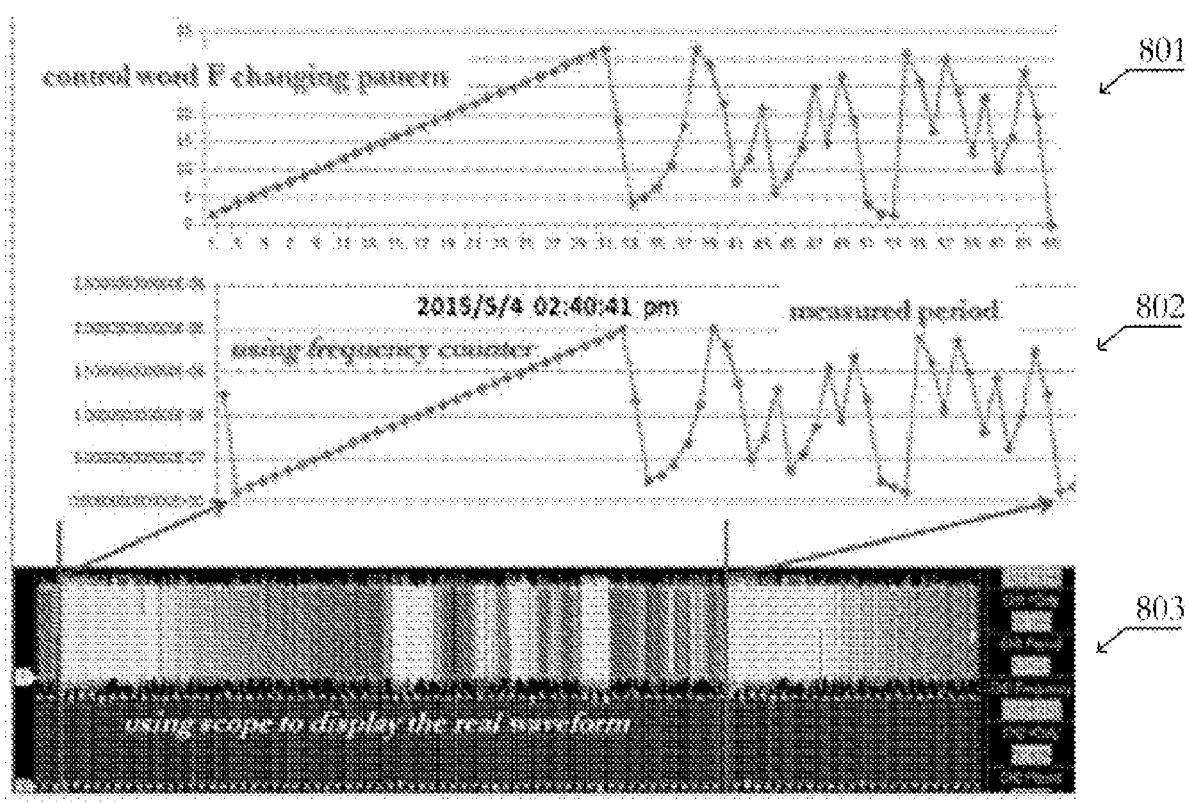
Figure 9:
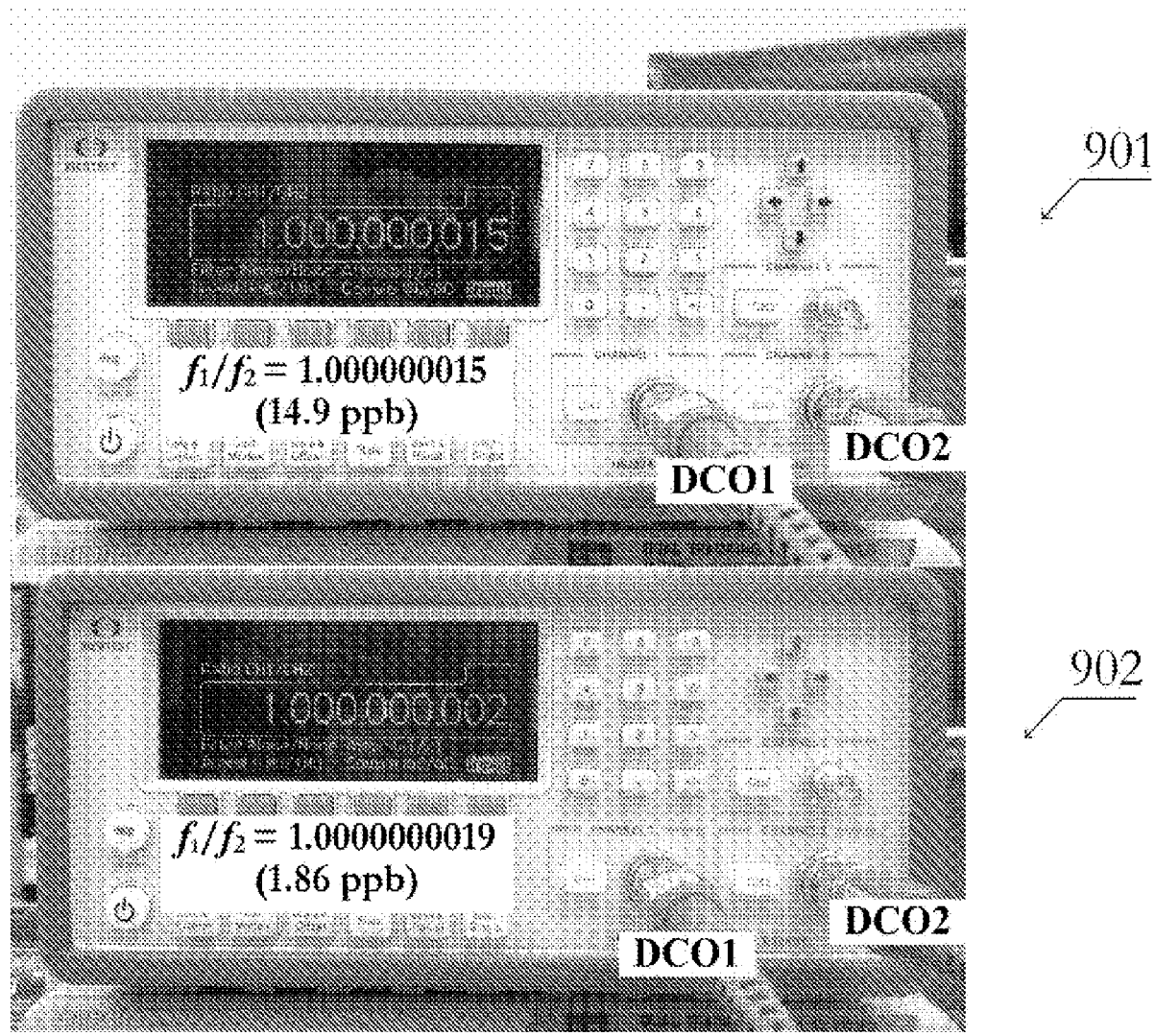
Figure 10:
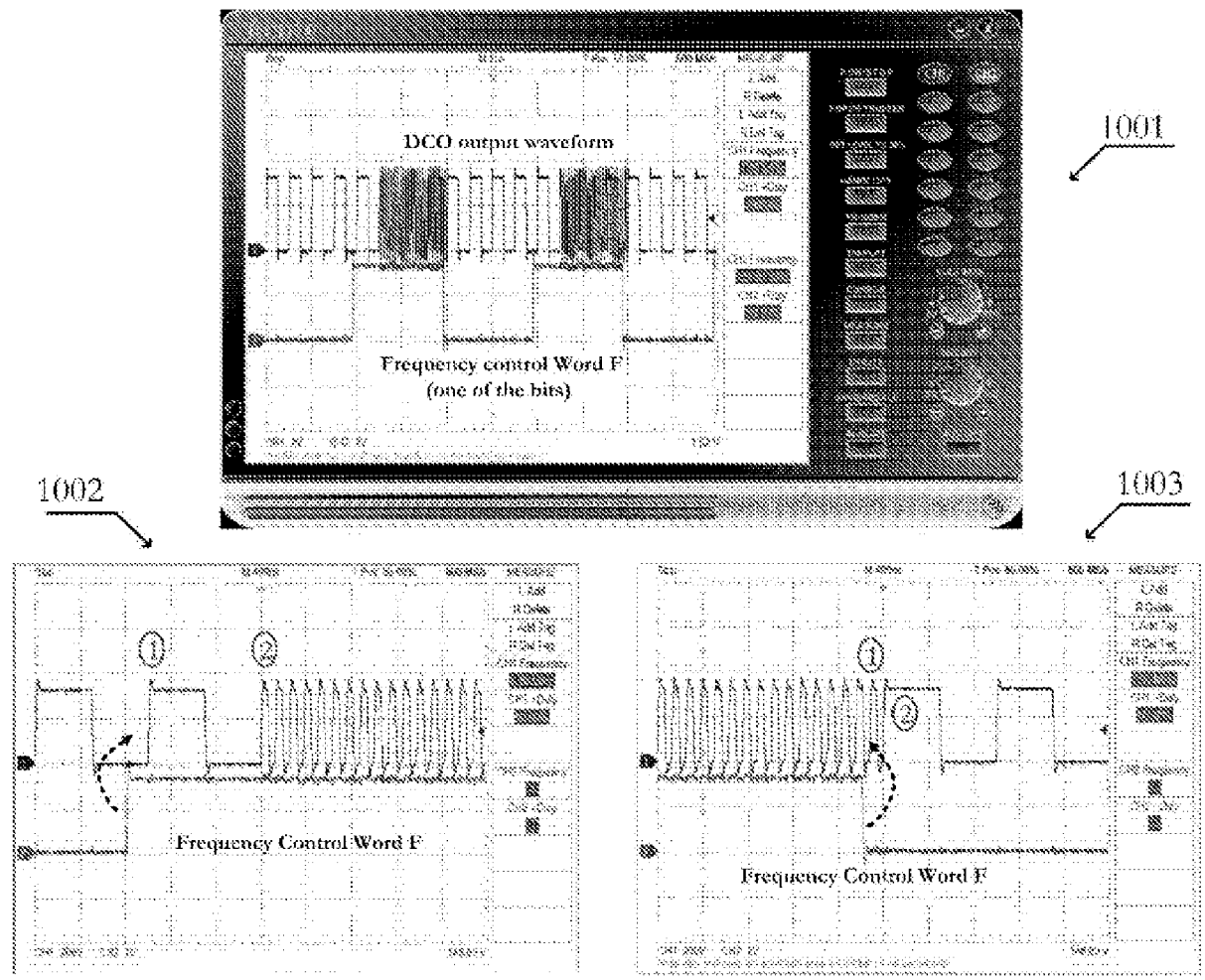
Figure 11:
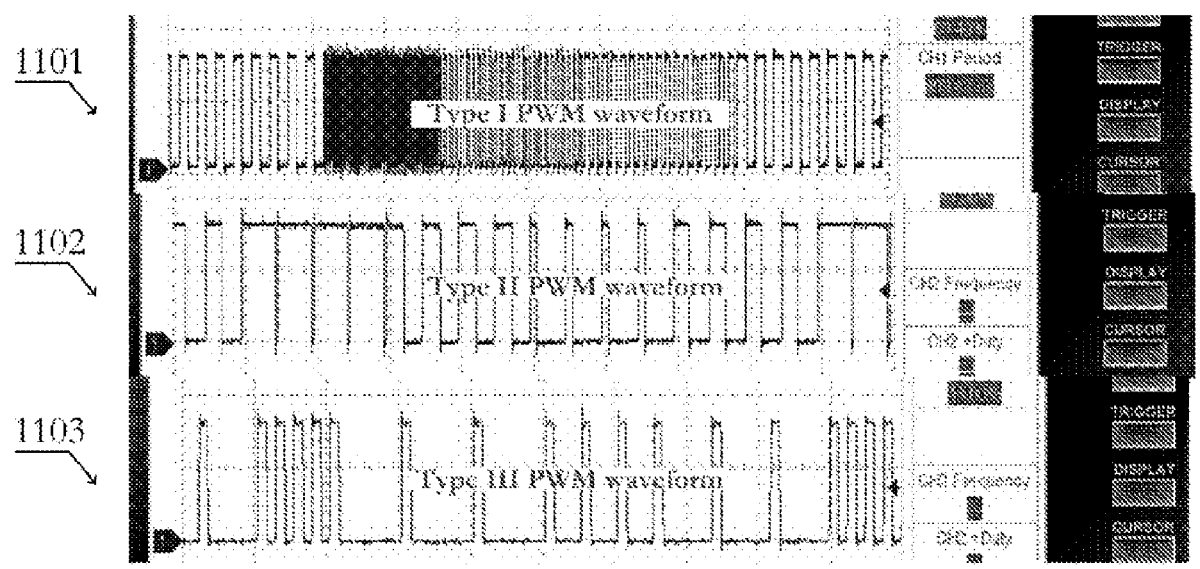
Figure 12:
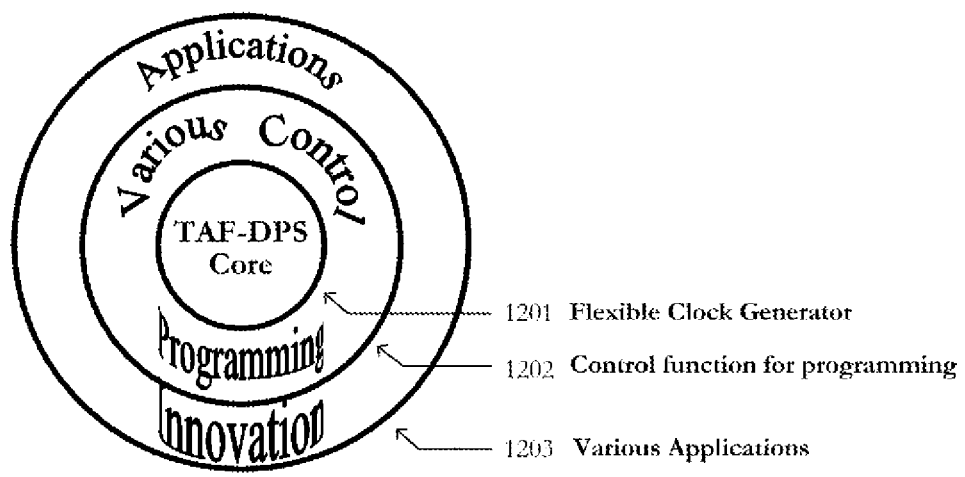

FIG. 12 illustrates the approach of using TAF-DPS clock generator to create innovation in application level. As shown, a TAF-DPS clock generator is first created on a programmable logic chip (such as a FPGA or CPLD or other type of chip) as a core 1201 by configuring the configurable block on said programmable logic chip. From the specific requirement of a given application 1203, a control function 1202 is created to program the frequency control word and duty-cycle control word of said TAF-DPS clock generator so that its output frequency and duty-cycle can be controlled. Said control function can be created in hardware by configuring the configurable blocks on said programmable logic chip. Said control function can also be created in software. From the output of said control function 1202, said TAF-DPS clock generators produce flexible clock signals. Said flexible clock signals are used to drive the functional circuits in said application 1203. By utilizing the features of arbitrary frequency generation and instantaneous frequency switching that are made possible by said TAF-DPS clock generator, various innovations can be created in application level.

Refer now back to FIG. 6A, when a programmable logic chip 600 is chosen as the information processing engine for an application, a plurality of strategic locations can be selected based on the operation scenario of said application. For each said strategic locations, at least one TAF-DPS clock generator can be created from the configurable resource of said programmable logic chip. From the specific requirement of a strategic location, a control function is generated for the corresponding TAF-DPS clock generators in said location. Said control function is used to program said TAF-DPS clock generators. The flexible clock signals generated from said TAF-DPS clock generators are used to drive the functional circuits in said programmable logic chip 600.

Exemplary Method of Using Programmable Logic Chip to Create TAF-DPS Clock Generator The present invention further relates to a method of using configurable blocks in a programmable logic chip to create a plurality of TAF-DPS clock generators on said chip. The method generally comprises the steps of (1) using configurable blocks to generate a plurality of phase-evenly-spaced-signals, or using on-chip PLL to generate a plurality of phase-evenly-spaced-signals, or using on-chip DLL to generate a plurality of phase-evenly-spaced-signals; 2) using configurable blocks to create one or more TAF-DPS frequency synthesizers; 3) feeding said plurality of phase-evenly-spaced-signals to said TAF-DPS frequency synthesizers; 4) programming said TAF-DPS frequency synthesizers to produce clock output signals of desired frequency, desired duty cycle, and etc.

Exemplary Method of Using TAF-DPS Clock Generators on Programmable Logic Chip to Drive Applications The present invention further relates to a method of using TAF-DPS clock generators implemented on a programmable logic chip to drive applications. The method generally comprises the steps of (1) creating a specification for a control function based on the requirement of a given application; 2) using configurable blocks to generate said control function that is used to program said TAF-DPS clock generators' frequency, duty-cycle and other parameters, or using software to control said TAF-DPS clock generators' frequency, duty-cycle and other parameters; 3) incorporating said TAF-DPS clock generators and said control function in said application; 4) driving the circuits of said application by flexible clock signals generated from said TAF-DPS clock generators.

CONCLUSION/SUMMARY

Thus, the present invention provides circuits and methods to create TAF-DPS clock generators producing flexible clock signals of fine frequency resolution and fast frequency switching. Said TAF-DPS clock generators are created from configurable blocks in programmable logic chip. The flexible clock signals are used to drive applications with the intention of enabling innovation. The present invention uses the principle of Time-Average-Frequency direct period synthesis to create flexible clock signals on said programmable logic chip. Thus, the present invention advantageously utilizes the TAF-DPS clock generator's capabilities of arbitrary frequency generation and instantaneous frequency switching. Therefore, it enables innovations in application level.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

[1] L. Xiu, "The Concept of Time-Average-Frequency and Mathematical Analysis of Flying-Adder Frequency Synthesis Architecture," IEEE Circuit And System Magazine, 3rd quarter, pp. 27-51, September 2008.

[2] L. Xiu, "*Nanometer Frequency Synthesis beyond Phase Locked Loop*," August 2012, John Wiley IEEE press.

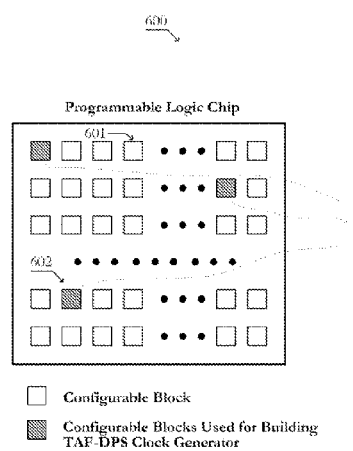

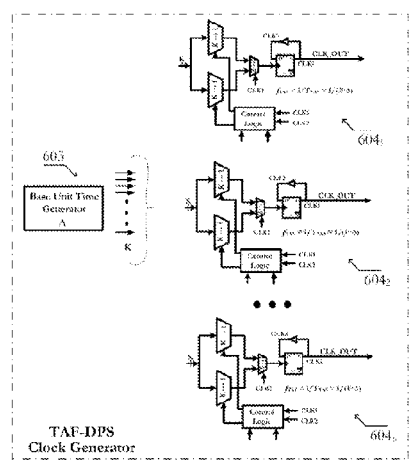

What is claimed is:

1. A TAF-DPS clock generator implemented on programmable logic chip, for generating a flexible clock signal, comprises:
   a first input for receiving a frequency control word, said frequency control word is used to control frequency of said flexible clock signal;
   a second input for receiving a duty-cycle control word, said duty-cycle control word is used to control duty-cycle of said flexible clock signal;
   a third input for receiving a reference clock signal of a known frequency;
   an output for delivering said flexible clock signal;
   a base time unit generator, having an input for receiving said reference clock signal, having an output for delivering a plurality of K phase-evenly-spaced-signals with a predetermined frequency where K is an integer of greater than one, said base time unit generator is created using resource from said programmable logic chip, said base time unit is reconfigurable when instructed for changing the value of K and changing said predetermined frequency;
   a TAF-DPS frequency synthesizer, having a frequency control word input for receiving said frequency control word from said first input, having a duty-cycle control word input for receiving said duty-cycle control word from said second input, having a third input for receiving said plurality of K phase-evenly-spaced-signals from said base time unit generator, having a clock output for delivering a synthesized flexible clock signal with desired frequency and desired duty-cycle, said TAF-DPS frequency synthesizer is created using resource from said programmable logic chip, said TAF-DPS frequency synthesizer is reconfigurable when instructed for accommodating a different K value;
   wherein said clock output of said TAF-DPS frequency synthesizer is connected to said output.

2. The system of claim 1, wherein said base time unit generator is created from a divider chain, said divider chain comprises a series of flip-flops driven by said reference clock signal, said flip-flops are connected in series to form a loop, all non-inverting and inverting outputs from said flip-flips form said plurality of K phase-evenly-spaced-signals, said divider chain is created using configurable blocks of said programmable logic chip.

3. The system of claim 1, wherein said base time unit generator is created from a PLL, said PLL is resided in said programmable logic chip as a standard module, said PLL uses said reference clock signal as its input reference, said PLL is configured to operate at a predetermined frequency, said PLL has a VCO (voltage control oscillator) having multiple stages, all outputs from said stages form said plurality of K phase-evenly-spaced-signals.

4. The system of claim 1, wherein said base time unit generator is created from a DLL, said DLL is resided in said programmable logic chip as a standard module, said DLL uses said reference clock signal as its input, said DLL has a VCDL (voltage controlled delay line) having multiple stages, all outputs from said stages form said plurality of K phase-evenly-spaced-signals.

5. The system of claim 1, wherein said TAF-DPS frequency synthesizer comprises:
   a first K→1 multiplexer, having a multi-bit reference input for receiving said plurality of K phase-evenly-spaced-signals, having a control input, having an output;
   a second K→1 multiplexer, having a multi-bit reference input for receiving said plurality of K phase-evenly-spaced-signals, having a control input, having an output;
   a 2→1 multiplexer, having a first input for receiving the output from said first K→1 multiplexer, having a second input for receiving the output from said second K→1 multiplexer, having a control input, having an output;
   a toggle flip-flop for generating a pulse train, comprises:
      a D-type flip-flop, having a clock input for receiving output from the output of said 2→1 multiplexer, having a data input, having an output for outputting a CLK1 signal;
      an inverter, having an input for receiving said CLK1 signal, having an output for outputting a CLK2 signal;
      wherein said CLK2 signal is connected to said data input of said D-type flip-flop;
      wherein said CLK1 signal contains said pulse train;
   a control logic block, having a first input for receiving said frequency control word, having a second input for receiving said duty-cycle control word, having a third input for receiving said CLK1 signal, having a fourth input for receiving said CLK2 signal, having a first output connected to said control input of said first K→1 multiplexer, having a second output connected to said control input of said second K→1 multiplexer;
   wherein said CLK1 signal is connected to said control input of said 2→1 multiplexer;
   wherein said CLK1 signal is outputted as said synthesized flexible clock signal.

6. The system of claim 5, wherein said K→1 multiplexers, said 2→1 multiplexer, said control logic block and said toggle flip-flop are created by configuring configurable blocks from said programmable logic chip, wherein all interconnecting connections among circuits are created using resource of said programmable logic chip.

7. A method of creating TAF-DPS clock generators on a programmable logic chip, comprising the steps of:
   selecting a plurality of areas in said programmable logic chip, said areas are distributed in strategic locations of said programmable logic chip, said strategic locations are chosen by user of said programmable logic chip;
creating at least one TAF-DPS clock generators for each said area;
driving functional circuits in each said areas by flexible clock signals generated from said TAF-DPS clock generators in each said area.

8. The method of claim 7, wherein the creating of TAF-DPS clock generator comprises the steps of:
creating a plurality of phase-evenly-spaced-signals from a base time unit;
creating a TAF-DPS frequency synthesizer by configuring configurable blocks of said programmable logic chip;
feeding said plurality of phase-evenly-spaced-signals to said TAF-DPS frequency synthesizer;
outputting flexible clock signal synthesized from said TAF-DPS frequency synthesizer as clock signal.

9. The method of claim 8, wherein the creating of said base time unit for generating a plurality of phase-evenly-spaced-signals comprises the steps of:
receiving a reference clock of known frequency;
creating a series of flip-flops by configuring configurable blocks in said programmable logic chip;
connecting said series of flip-flops as a loop;
driving said series of flip-flops by said reference clock of known frequency;
outputting all non-inverting and inverting outputs from said flip-flops as said plurality of phase-evenly-spaced-signals.

10. The method of claim 8, wherein the creating of base time unit comprises the steps of:
receiving a reference signal of known frequency;
selecting a PLL from said programmable logic chip;
locking said PLL to said reference signal of known frequency;
configuring said PLL to generate a plurality of outputs with a predetermined frequency;
outputting said plurality of outputs from said PLL as said plurality of phase-evenly-spaced-signals.

11. The method of claim 8, wherein the creating of base time unit comprises the steps of:
receiving a reference signal of known frequency;
selecting a DLL from said programmable logic chip;
locking said DLL to said reference signal of known frequency;
configuring said DLL to generate a plurality of outputs with a predetermined frequency;
outputting said plurality of outputs from said DLL as said plurality of phase-evenly-spaced-signals.

12. A method of driving circuits in an application by a flexible clock signal generated from a TAF-DPS clock generator, said TAF-DPS clock generator is implemented on a programmable logic chip, comprises the steps of:
creating a specification of requirement on clock signal performance for said application;
generating said flexible clock signal from said TAF-DPS clock generator, said TAF-DPS clock generator is created by using resource of said programmable logic chip;
programming frequency control word and duty-cycle control word of said TAF-DPS clock generator to generate said flexible clock signal, said flexible clock signal achieves the performance defined in said specification of requirement;
driving circuits in said application by said flexible clock signal.

13. The method of claim 12, wherein the programming of frequency control word and duty-cycle control word is accomplished by a control circuit, said control circuit is created by configuring configurable blocks resided on said programmable logic chip.

14. The method of claim 12, wherein the programming of frequency control word and duty-cycle control word is accomplished by software, said software is executed in a processor, said processor is incorporated in said application environment.

* * * * *

UNITED STATES PATENT AND TRADEMARK OFFICE
CERTIFICATE OF CORRECTION

PATENT NO. : 9,621,173 B1
APPLICATION NO. : 14/945468
DATED : April 11, 2017
INVENTOR(S) : Liming Xiu It is certified that error appears in the above-identified patent and that said Letters Patent is hereby corrected as shown below:

Delete the title page and substitute therefore with the attached title page consisting of the corrected illustrative figure(s).

Please replace FIGS. 1-12 with FIGS. 1-12 as shown on the attached pages.

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*

(12) United States Patent
Xiu

(10) Patent No.: US 9,621,173 B1
(45) Date of Patent: Apr. 11, 2017

(54) CIRCUITS AND METHODS OF IMPLEMENTING TIME-AVERAGE-FREQUENCY DIRECT PERIOD SYNTHESIZER ON PROGRAMMABLE LOGIC CHIP AND DRIVING APPLICATIONS USING THE SAME

(71) Applicant: Liming Xiu, Plano, TX (US)

(72) Inventor: Liming Xiu, Plano, TX (US)

(73) Assignee: LIMING XIU, Plano (*) Notice: Subject to any disclaimer, the term of this patent is extended or adjusted under 35 U.S.C. 154(b) by 0 days.

(21) Appl. No.: 14/945,468

(22) Filed: Nov. 19, 2015

(51) Int. Cl.
| | |
|---|---|
| G06F 17/50 | (2006.01) |
| H03L 7/197 | (2006.01) |
| H03K 19/173 | (2006.01) |
| H03K 19/017 | (2006.01) |
| H03K 19/018 | (2006.01) |
| G06F 1/10 | (2006.01) |
| G06F 1/12 | (2006.01) |
| H03L 7/099 | (2006.01) |
| H03K 19/0185 | (2006.01) |
| H03K 19/096 | (2006.01) |

(52) U.S. Cl.
CPC .......... *H03L 7/197* (2013.01); *G06F 17/5054* (2013.01); *H03K 19/1737* (2013.01); *H03L 7/0991* (2013.01); *G06F 1/10* (2013.01); *G06F 1/12* (2013.01); *G06F 17/505* (2013.01); *G06F 17/5045* (2013.01); *H03K 19/01728* (2013.01); *H03K 19/01855* (2013.01); *H03K 19/096* (2013.01)

(58) Field of Classification Search
CPC ... H03L 7/197; H03L 7/0991; H03K 19/1737; H03K 19/096; H03K 19/01728; H03K 19/01855; G06F 17/5045; G06F 17/505; G06F 17/5054; G06F 1/10; G06F 17/12
USPC .......... 716/116–117; 326/37–38, 93, 96, 99; 327/39–40, 100, 113, 115–117
See application file for complete search history.

(56) References Cited

U.S. PATENT DOCUMENTS

| | | | |
|---|---|---|---|
| 8,890,591 B1* | 11/2014 | Xiu | H03L 1/022 327/147 |
| 9,118,275 B1* | 8/2015 | Xiu | H03B 21/02 |
| 9,379,714 B1* | 6/2016 | Xiu | G04F 10/005 |

(Continued)

*Primary Examiner* — Stacy Whitmore

(57) ABSTRACT

Circuits of a TAF-DPS clock generator implemented on programmable logic chip comprise: 1) a base time unit generator created from configurable blocks, or on-chip PLL, or on-chip DLL, said base time unit generator produces a plurality of phase-evenly-spaced-signals; 2) a TAF-DPS frequency synthesizer created by configuring configurable blocks of said programmable logic chip, said TAF-DPS frequency synthesizer takes said plurality of phase-evenly-spaced-signals as its input. Methods of creating flexible clock signal to drive application comprise: 1) selecting one or more strategic areas in said programmable logic chip; 2) creating one or more TAF-DPS clock generator for each said area by using the configurable resource in said area; 3) creating control function to control the frequency and duty-cycle of the TAF-DPS clock generator output, said control function can be circuit created from configuring configurable blocks, said control function can also be achieved by software; 4) driving the circuits in application by the flexible clock generated from said TAF-DPS clock generator.

14 Claims, 11 Drawing Sheets